United States Patent [19]
Andrekanic et al.

[11] Patent Number: 5,741,873
[45] Date of Patent: Apr. 21, 1998

[54] LOW ORGANIC EMISSION RESINS

[75] Inventors: Ronald A. Andrekanic; Joseph Pugach, both of Allegheny County; Thomas W. Smeal, Westmoreland County, all of Pa.

[73] Assignee: Aristech Chemical Corporation, Pittsburgh, Pa.

[21] Appl. No.: 883,992

[22] Filed: Jun. 27, 1997

[51] Int. Cl.$^6$ .................................................. C08F 12/24
[52] U.S. Cl. .................................................. 526/313
[58] Field of Search .................................................. 526/313

[56] References Cited

U.S. PATENT DOCUMENTS 5,501,830  3/1996  Smeal et al. .

FOREIGN PATENT DOCUMENTS 2010868  7/1979  United Kingdom .................. 526/313

*Primary Examiner*—Joseph L. Schofer
*Assistant Examiner*—N. Sarofim
*Attorney, Agent, or Firm*—Robert R. Gavlik

[57] ABSTRACT

The present invention relates to a composition comprising at least one alkoxylated bisphenol-A diacrylate or dimethacrylate, ethylene glycol dimethacrylate, and at least one vinyl monomer. The composition is suitable for use in the fiberglass reinforced plastic art. The composition possesses similar or superior physical properties compared to unsaturated polyester based specialty resins, including emitting lower levels of organic volatiles than typical resins used in the art.

10 Claims, No Drawings

LOW ORGANIC EMISSION RESINS

TECHNICAL FIELD

The present invention relates to polymer resin compositions useful in applications traditionally utilizing fiberglass reinforced plastic and low volatile emission specialty polyester resins.

BACKGROUND OF THE INVENTION

Fiberglass reinforced plastic resins are well known in the art. These resins find use in typical applications such as boat hulls, automotive parts, structural applications, pultrusion and mine bolts.

Low emission resins are also known in the art. For example, Smeal et al in U.S. Pat. No. 5,501,830 disclose unsaturated polyester based resins that emit no more than 20.0 g/m$^2$ as measured by Rule 1162 Standard Method for Static Volatile Emissions of the South Coast Air Quality Management District (California).

It is an object of the present invention to provide a composition having at least one alkoxylated bisphenol-A diacrylate or dimethacrylate, ethylene glycol dimethacrylate, and at least one vinyl monomer.

It is another object of the present invention to provide a composition useful in the fiberglass reinforced plastic art. Still another object of the present invention is to provide a composition having similar or superior physical properties to unsaturated polyester based resins, including emission of lower levels of volatile emissions during polymerization.

SUMMARY OF THE INVENTION

The present invention relates to a novel class of polymer resins comprising a pre-polymerized blend of: (1) at least one alkoxylated bisphenol-A diacrylates or dimethacrylates ("ABAD"); (2) ethylene glycol dimethacrylate ("EGDM"); and (3) at least one vinyl monomer.

The composition of the present invention finds use in applications typically reserved for fiberglass reinforced plastic and specialty polyester resin compositions. The resins of the present invention possess physical properties normally associated with polyester and styrenated resin compositions. However, the resins of the present invention emit lower levels of organic volatiles during polymerization than typical prior art resins used in fiberglass reinforced plastic applications.

DETAILED DESCRIPTION OF THE INVENTION

The ABAD of the present invention is present in an amount of about 60 to about 90 wt % of the total composition. Preferably, it is about 70 to about 85 wt %, and most preferably 70 to 80 wt %. The ABAD is preferably selected from the group consisting of ethoxylated bisphenol-A dimethacrylates ("EBAD") having from 3 to 10 ethoxyl groups. Most preferably, it is 6-EBAD. Mixtures of these EBADs are also within the scope of the present invention.

EGDM is about 5 to about 30 wt % of the composition. Preferably, it is about 10 to about 25 wt %, and most preferably 10 to 20 wt %.

The vinyl monomer is about 5 to about 25 wt % of the composition. Preferably, it is about 10 to about 20 wt %, and most preferably 12 to 17 wt %. The vinyl monomer is preferably selected from the group consisting of styrene, vinyl toluene, t-butyl styrene and divinyl benzene. Most preferably, it is vinyl toluene.

The present invention is illustrated by, but not limited to the examples shown in Table I.

TABLE I

LOE RESINS CONTAINING VARIOUS COMBINATIONS OF
3, 6, AND 10 ETHOXYLATED BPA DIMETHACRYLATE,
ETHYLENE GLYCOL DIMETHACRYLATE & VINYL MONOMERS

| RESIN # | K-15 (1) | R-14 (1) | Z-11 (1) |
|---|---|---|---|
| COMPOSITION, % | | | |
| 3-EBPA DIMETHACRYLATE | 50 | 40 | — |
| 6-EBPA DIMETHACRYLATE | — | — | 70 |
| 10-EBPA DIMETHACRYLATE | 20 | 30 | — |
| ETH. GYLCOL DIMETHACRYLATE | 10 | 20 | 20 |
| VINYL TOLUENE (MONOMER) | 20 | 10 | 10 |
| STYRENE (MONOMER) | — | — | — |
| P-TERTIARY BUTYL STYRENE | — | — | — |
| MOD L, 25% HQ (INHIBITOR) | 0.05 | 0.04 | 0.05 |
| COBALT 12% (PROMOTER) | 0.30 | 0.30 | 0.30 |
| POTASSIUM 15% (COPROMOTER) | 0.20 | 0.20 | 0.20 |
| DMAA (COPROMOTER) | 0.30 | 0.30 | 0.30 |
| RESIN PROPERTIES (3) | | | |
| BRKFLD VISCOSITY @77 F., (CPS) | | | |
| RM. TEMP. (77 F.) GEL TIME: (MIN.) | 35 | 56 | 46 |
| INTERVAL, (MINUTES) | 33.0 (2) | 19.0 (2) | 18.0 (2) |
| PEAK EXOTHERM, (F.) | 7.2 | 3.8 | 5.0 |
| BARCOL HARDNESS-45 MINUTES | 338 | 279 | 313 |
| 1 HOUR | 31 (2) | 46 (2) | 37 (2) |
| 2 HOUR | 40 (2) | 45 (2) | 38 (2) |
| 3 HOUR | 40 (2) | 48 (2) | 38 (2) |
| 4 HOUR | 40 (2) | 48 (2) | 39 (2) |
| 24 HOURS | 40 (2) | 49 (2) | 39 (2) |
| 1162 VOLATILE EMISSIONS, (G/M2) | 42 (2) | 49 () | 38 (2) |
| EMISSION TIME, (MINUTES) | 21.8 (2) | 9.7 (2) | 10.3 (2) |

TABLE I-continued

LOE RESINS CONTAINING VARIOUS COMBINATIONS OF 3, 6, AND 10 ETHOXYLATED BPA DIMETHACRYLATE, ETHYLENE GLYCOL DIMETHACRYLATE & VINYL MONOMERS

| PHYSICAL PROPERTIES OF RESIN CLEAR CASTINGS: (3), (4) | 12.0 | 5.0 | 3.5 |
|---|---|---|---|
| TENSILE STRENGTH, (PSI) | 8,960 +/− 1,310 | 7,250 +/− 490 | 8,000 +/− 300 |
| TENSILE MODULUS, (MPSI) | 0.470 +/− 0.011 | 0.470 +/− 0.017 | 0.396 +/− 0.011 |
| TENSILE ELONGATION, (%) | 2.5 +/− 0.5 | 1.9 +/− 0.2 | 3.3 +/− 0.4 |
| FLEXURAL STRENGTH, (PSI) | 15,740 +/− 1,020 | 14,150 +/− 990 | 12,800 +/− 2,030 |
| FLEXURAL MODULUS, (MPSI) | 0.420 +/− 0.008 | 0.400 +/− 0.006 | 0.336 +/− 0.066 |
| HEAT DISTORTION TEMP: DTUL, F | 212 | 218 | 175 |
| WATER ABSORPTION @ 150° F. | | | |
| 24 HOURS: | 0.5 | 1.11 | 0.93 |
| 7 DAYS: | 0.68 | 1.45 | 1.14 |

| RESIN # | A-12 (1) | U-12 (1) | A-13 (1) |
|---|---|---|---|
| COMPOSTION, % | | | |
| 3-EBPA DIMETHACRYLATE | — | 50 | 50 |
| 6-EBPA DIMETHACRYLATE | — | 20 | 20 |
| 10-EBPA DIMETHACRYLATE | 70 | — | — |
| ETH. GYLCOL DIMETHACRYLATE | 15 | 10 | 10 |
| VINYL TOLUENE (MONOMER) | 15 | 20 | — |
| STYRENE (MONOMER) | — | — | 20 |
| P-TERTIARY BUTYL STYRENE | — | — | — |
| MOD L, 25% HQ (INHIBITOR) | 0.08 | 0.03 | 0.04 |
| COBALT 12% (PROMOTER) | 0.30 | 0.30 | 0.30 |
| POTASSIUM 15% (COPROMOTER) | 0.20 | 0.20 | 0.20 |
| DMAA (COPROMOTER) | 0.30 | 0.30 | 0.30 |
| RESIN PROPERTIES (3) | | | |
| BRKFLD VISCOSITY @77 F., (CPS) | 39 | 32 | 30 |
| RM. TEMP. (77 F.) GEL TIME: (MIN.) | 22.5 (2) | 22.9 (2) | 28.5 |
| INTERVAL, (MINUTES) | 6.3 | 5.8 | 7.3 |
| PEAK EXOTHERM, (F.) | 313 | 337 | 352 |
| BARCOL HARDNESS-45 MINUTES | 32 (2) | 40 (2) | 39 (2) |
| 1 HOUR | 36 (2) | 40 (2) | 40 (2) |
| 2 HOUR | 37 (2) | 42 (2) | 42 (2) |
| 3 HOUR | 37 (2) | 44 (2) | 42 (2) |
| 4 HOUR | 37 (2) | 48 (2) | 42 (2) |
| 24 HOURS | 38 (2) | 49 (2) | 42 (2) |
| 1162 VOLATILE EMISSIONS, (G/M2) | 4.8 (2) | 16.3 (2) | 30.9 (2) |
| EMISSION TIME, (MINUTES) | 9.0 | 27.5 | 19.0 |
| PHYSICAL PROPERTIES OF RESIN CLEAR CASTINGS: (3), (4) | | | |
| TENSILE STRENGTH, (PSI) | 7,700 +/− 400 | 8,710 +/− 840 | 7,230 +/− 570 |
| TENSILE MODULUS, (MPSI) | 0.402 +/− 0.010 | 0.510 +/− 0.012 | 0.514 +/− 0.018 |
| TENSILE ELONGATION, (%) | 2.9 +/− 0.5 | 2.0 +/− 0.3 | 1.6 +/− 0.2 |
| FLEXURAL STRENGTH, (PSI) | 13,090 +/− 640 | 16,660 +/− 1,400 | 14,770 +/− 1,520 |
| FLEXURAL MODULUS, (MPSI) | 0.352 +/− 0.005 | 0.443 +/− 0.014 | 0.458 +/− 0.003 |
| HEAT DISTORTION TEMP: DTUL, F. | 169 | 216 | 233 |
| WATER ABSORPTION @ 150° F. | | | |
| 24 HOURS: | 0.95 | 0.50 | 0.62 |
| 7 DAYS: | 1.10 | 0.73 | 0.80 |

| RESIN # | D-13 (1) | M-13 (1) |
|---|---|---|
| COMPOSTION, % | | |
| 3-EBPA DIMETHACRYLATE | 50 | 5 |
| 6-EBPA DIMETHACRYLATE | 20 | 70 |
| 10-EBPA DIMETHACRYLATE | — | — |
| ETH. GYLCOL DIMETHACRYLATE | 20 | 20 |
| VINYL TOLUENE (MONOMER) | — | — |
| STYRENE (MONOMER) | 10 | — |
| P-TERTIARY BUTYL STYRENE | — | 5 |
| MOD L, 25% HQ (INHIBITOR) | 0.02 | 0.03 |
| COBALT 12% (PROMOTER) | 0.30 | 0.30 |
| POTASSIUM 15% (COPROMOTER) | 0.20 | 0.20 |
| DMAA (COPROMOTER) | 0.30 | 0.30 |
| RESIN PROPERTIES (3) | | |
| BRKFLD VISCOSITY @77 F., (CPS) | 48 | 90 |
| RM. TEMP. (77 F.) GEL TIME: (MIN.) | 25.0 (2) | 18.0 (2) |
| INTERVAL, (MINUTES) | 5.8 | 5.3 |

TABLE I-continued

LOE RESINS CONTAINING VARIOUS COMBINATIONS OF
3, 6, AND 10 ETHOXYLATED BPA DIMETHACRYLATE,
ETHYLENE GLYCOL DIMETHACRYLATE & VINYL MONOMERS

| | | |
|---|---|---|
| PEAK EXOTHERM, (F.) | 329 | 286 |
| BARCOL HARDNESS-45 MINUTES | 45 (2) | 42 (2) |
| 1 HOUR | 48 (2) | 42 (2) |
| 2 HOUR | 49 (2) | 43 (2) |
| 3 HOUR | 51 (2) | 44 (2) |
| 4 HOUR | 53 (2) | 45 (2) |
| 24 HOURS | 54 (2) | 45 (2) |
| 1162 VOLATILE EMISSIONS, (G/M2) | 14.5 (2) | 5.4 (2) |
| EMISSION TIME, (MINUTES) | 3.0 | 5.5 |
| PHYSICAL PROPERTIES OF RESIN CLEAR CASTINGS: (3), (4) | | |
| TENSILE STRENGTH, (PSI) | 6,696 +/− 835 | 7,270 +/− 280 |
| TENSILE MODULUS, (MPSI) | 0.520 +/− 0.020 | 0.410 +/− 0.020 |
| TENSILE ELONGATION, (%) | 1.4 +/− 0.2 | 2.4 +/− 0.3 |
| FLEXURAL STRENGTH, (PSI) | 12,636 +/− 838 | 14,550 +/− 1,160 |
| FLEXURAL MODULUS, (MPSI) | 0.460 +/− 0.028 | 0.371 +/− 0.006 |
| HEAT DISTORTION TEMP: DTUL, F. | 250 | 208 |
| WATER ABSORPTION @ 150° F. | | |
| 24 HOURS: | 0.64 | 1.27 |
| 7 DAYS: | 1.04 | 1.62 |

(1) MODERATE AMOUNT OF FOAMING INITIALLY GENERATED WHEN MIXING THE INITIATOR IN WITH THE RESIN.
FOAMING SHORTLY THEREAFTER DISSIPATES
(2) SLT TACKY SURFACE OF CURED RESIN REMAINED FOR A COUPLE OF DAYS
(3) −1.5% HIPOINT 90 MEKP ROOM TEMPERATURE INITIATOR
(4) 2 HOUR ROOM TEMPERATURE (77° F.) CURE, 2 HOUR POSTCURE @100° C.

We claim:

1. A composition consisting essentially of:
   (a) about 60 to about 90 wt % of at least one alkoxylated bisphenol-A diacrylate or dimethacrylate;
   (b) about 5 to about 30 wt % ethylene glycol dimethacrylate; and
   (c) about 5 to about 25 wt % of a vinyl monomer selected from the group consisting of vinyl toluene, styrene, t-butyl styrene and divinyl benzene.

2. A compositon according to claim 1 wherein the alkoxylated bisphenol-A diacrylate or dimethacrylate is about 70–85 wt % of the composition.

3. A composition according to claim 1 wherein the alkoxylated bisphenol-A diacrylate or dimethacrylate is about 70–80 wt % of the composition.

4. A composition according to claim 1 wherein the at least one alkoxylated bisphenol-A diacrylate or dimethacrylate is selected from the group consisting of ethylene glycol dimethacrylates having 3–10 ethoxy groups.

5. A composition according to claim 1 wherein the at least one alkoxylated bisphenol-A diacrylate or dimethacrylate is 6-ethoxylated bisphenol-A dimethacrylate.

6. A composition according to claim 1 wherein the ethylene glycol dimethacrylate is about 10–25 wt % of the composition.

7. A composition according to claim 1 wherein the ethylene glycol dimethacrylate is about 10–20 wt % of the composition.

8. A composition according to claim 1 wherein the vinyl monomer is about 10–20 wt % of the composition.

9. A composition according to claim 1 wherein the vinyl monomer is about 12–17 wt % f the composition.

10. A composition according to claim 1 wherein the vinyl monomer is vinyl toluene.

\* \* \* \* \*